US012703442B2

(12) United States Patent
Saito et al.

(10) Patent No.: US 12,703,442 B2
(45) Date of Patent: Aug. 11, 2026

(54) VORTEX GENERATOR FOR A VEHICLE

(71) Applicant: GM Global Technology Operations LLC, Detroit, MI (US)

(72) Inventors: Fernando Hiroshi Saito, Lake Orion, MI (US); Connor Dane Buckman, Waterford, MI (US); Ljubomir Erakovic, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 545 days.

(21) Appl. No.: 18/317,336

(22) Filed: May 15, 2023

(65) Prior Publication Data

US 2024/0383546 A1 Nov. 21, 2024

(51) Int. Cl.
*B62D 35/02* (2006.01)
*B62D 35/00* (2006.01)

(52) U.S. Cl.
CPC ........... *B62D 35/02* (2013.01); *B62D 35/005* (2013.01)

(58) Field of Classification Search
CPC .... B62D 35/02; B62D 35/005; B62D 35/008; B62D 25/18; Y02T 10/82
USPC ........................................... 296/180.1, 181.5
See application file for complete search history.

(56) References Cited

U.S. PATENT DOCUMENTS 8,276,973 B2 * 10/2012 Hasegawa .............. B62D 35/02 296/180.1
9,969,367 B2 * 5/2018 Schmidt ................ B62D 25/16
2010/0156142 A1 * 6/2010 Sumitani ................ B62D 37/02 296/180.1
2012/0013146 A1 * 1/2012 Wolf ...................... B62D 35/02 296/180.5
2017/0291649 A1 * 10/2017 Zuhlsdorf .............. B62D 35/02
2018/0251165 A1 * 9/2018 Shibutake ............ B62D 35/005
2019/0176899 A1 * 6/2019 Miwa ..................... B60K 11/04
2020/0239087 A1 * 7/2020 Nakamura ............ B62D 37/02

FOREIGN PATENT DOCUMENTS

CN 203666809 U * 6/2014
CN 209870549 U * 12/2019
CN 111776089 A * 10/2020 ........... B62D 35/005
DE 102011089074 A1 * 6/2013 ........... B62D 35/005
DE 102020133644 A1 * 6/2022 ............. B62D 35/02
KR 20210030020 A * 3/2021 ............. B62D 37/02
WO WO-2023047028 A1 * 3/2023 ........... B62D 35/008

OTHER PUBLICATIONS

Ren et al. (CN 111776089 A), machine translation (Year: 2020).*
Boueilh (WO 2023047028 A1), machine translation (Year: 2023).*

* cited by examiner

*Primary Examiner* — Vivek D Koppikar
*Assistant Examiner* — Wenwei Zhuo
(74) *Attorney, Agent, or Firm* — CANTOR COLBURN LLP

(57) ABSTRACT

A vehicle body component includes an underbody panel having an underbody surface and a wheel well panel including a forward edge portion connected to the underbody panel. The wheel well panel includes an arcuate surface that extends from the underbody surface. An air deflector is arranged at the forward edge portion of the wheel well panel. A vortex generator is mounted to the underbody surface at the wheel well panel. The vortex generator disrupts air currents flowing over the air deflector.

14 Claims, 2 Drawing Sheets

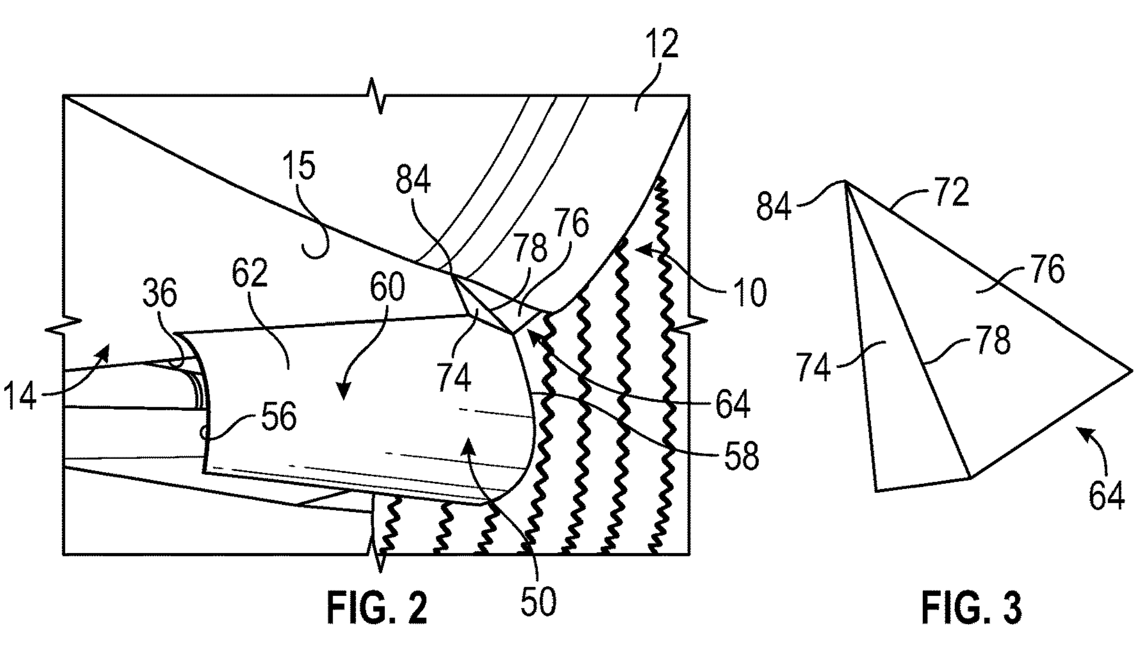
FIG. 2
FIG. 3
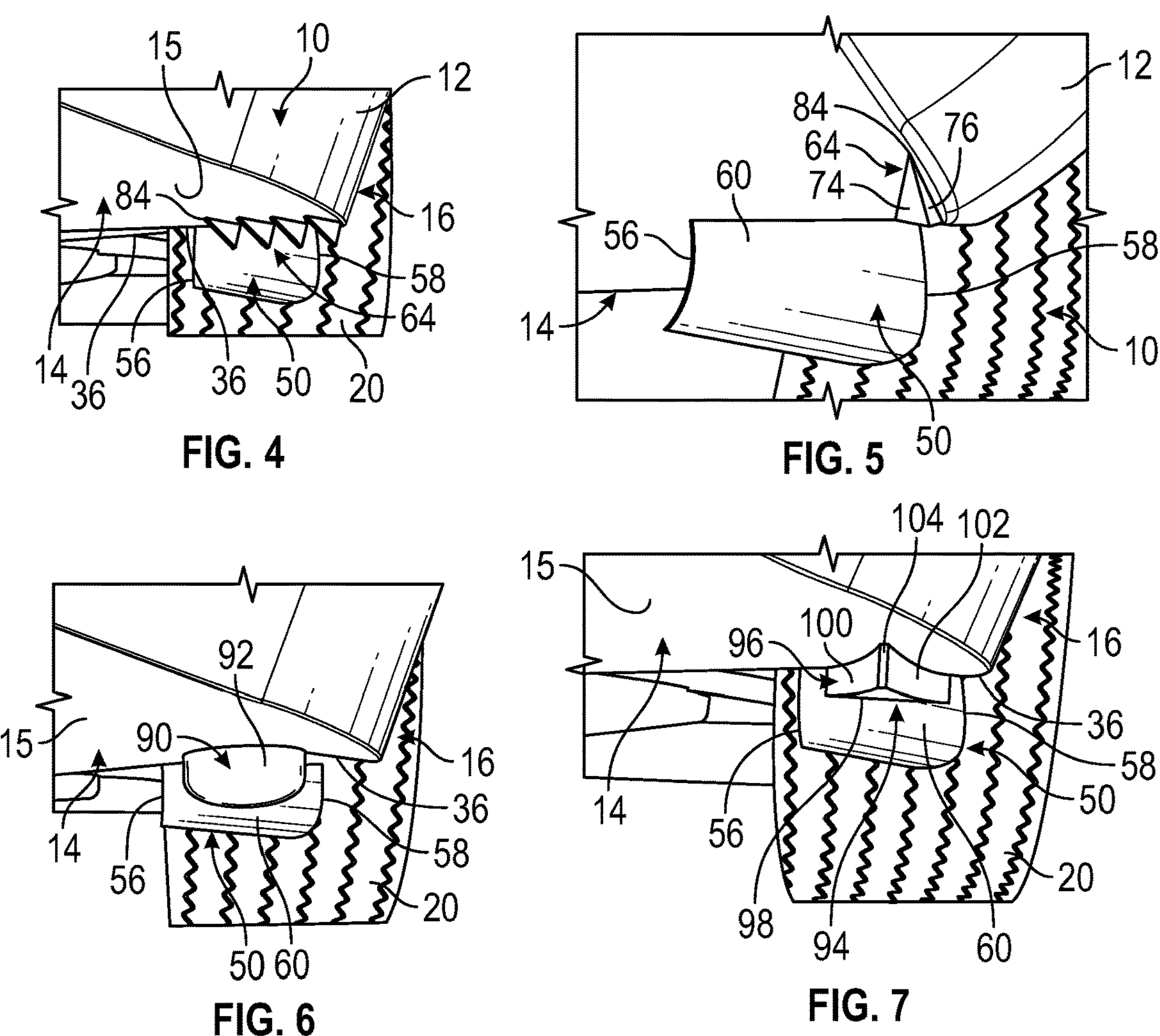
FIG. 4
FIG. 5
FIG. 6
FIG. 7

VORTEX GENERATOR FOR A VEHICLE

INTRODUCTION

The subject disclosure relates to the art of vehicles and, more particularly, to a vortex generator configured to disrupt air currents at front wheels of the vehicle.

As vehicles move through an airstream, drag is produced. That is, air currents impact exposed surfaces of the vehicle and create drag. Drag imparts a retarding force on the vehicle. This retarding force has an impact on fuel consumption and, by extension, fuel efficiency of the vehicle. The effects of drag are particularly felt by electric vehicles where range and available charging stations are a concern. Various stationary surfaces contribute to drag. Flat forward facing surfaces such as grills, lights, body components, and the like all contribute to reducing an overall operational range of a vehicle.

In addition to stationary surfaces, dynamic surfaces such as wheels, also contribute to drag effects. In order to reduce drag at the wheels, vehicle manufacturers have incorporated strakes into internal wheel well surfaces and/or positioned deflectors in front of the wheels. While the deflectors do have a positive effect on drag, they also contribute to drag effects. Accordingly, it is desirable to provide a system for interrupting airflow passing over the deflectors in order to further reduce drag effects to increase an overall operational range of the vehicle.

SUMMARY

A vehicle body component, in accordance with a non-limiting example, includes an underbody panel having an underbody surface and a wheel well panel including a forward edge portion connected to the underbody panel. The wheel well panel includes an arcuate surface that extends from the underbody surface. An air deflector is arranged at the forward edge portion of the wheel well panel. A vortex generator is mounted to the underbody surface at the wheel well panel. The vortex generator disrupts air currents flowing over the air deflector.

In addition to one or more of the features described herein the air deflector includes an inwardly facing edge, an outwardly facing edge, and a deflector surface extending between the inwardly facing edge and the outwardly facing edge, the vortex generator being positioned at one of the outwardly facing edge and the deflector surface.

In addition to one or more of the features described herein the vortex generator is mounted to the underbody surface at one of the deflector surface and the outwardly facing edge.

In addition to one or more of the features described herein the vortex generator includes a triangular cross-section including a base portion, a first side portion, and a second side portion, the first side portion and the second side portion extending from the base portion to a vertex.

In addition to one or more of the features described herein the vortex generator comprises a plurality of vortex generators mounted to the underbody panel across the deflector surface.

In addition to one or more of the features described herein the vortex generator includes a wedge-shaped profile having a base arranged at the deflector surface and an apex spaced from the deflector surface.

In addition to one or more of the features described herein the apex of the vortex generator projects outwardly of the underbody surface.

In addition to one or more of the features described herein the vortex generator includes a curvilinear outwardly facing surface.

In addition to one or more of the features described herein the vortex generator is mounted to the underbody surface adjacent the deflector surface, the vortex generator being spaced from the outwardly facing edge and the inwardly facing edge.

In addition to one or more of the features described herein the vortex generator is mounted to the arcuate surface of the wheel well panel adjacent the outwardly facing edge.

A vehicle, in accordance with a non-limiting example, includes a body defining a passenger compartment. The body includes a body component including an underbody panel having an underbody surface and a wheel well panel including a forward edge portion connected to the underbody panel. The wheel well panel includes an arcuate surface that extends from the underbody surface. An air deflector is arranged at the forward edge portion of the wheel well panel. A vortex generator is mounted to the underbody surface at the wheel well panel, the vortex generator disrupting air currents flowing over the air deflector.

In addition to one or more of the features described herein the air deflector includes an inwardly facing edge, an outwardly facing edge, and a deflector surface extending between the inwardly facing edge and the outwardly facing edge, the vortex generator being positioned at one of the outwardly facing edge and the deflector surface.

In addition to one or more of the features described herein the vortex generator is mounted to the underbody surface at one of the deflector surface and the outwardly facing edge.

In addition to one or more of the features described herein the vortex generator includes a triangular cross-section including a base portion, a first side portion, and a second side portion, the first side portion and the second side portion extending from the base portion to a vertex.

In addition to one or more of the features described herein the vortex generator comprises a plurality of vortex generators mounted to the underbody panel across the deflector surface.

In addition to one or more of the features described herein the vortex generator includes a wedge-shaped profile having a base arranged at the deflector surface and an apex spaced from the deflector surface.

In addition to one or more of the features described herein the apex of the vortex generator projects outwardly of the underbody surface.

In addition to one or more of the features described herein the vortex generator includes a curvilinear outwardly facing surface.

In addition to one or more of the features described herein the vortex generator is mounted to the underbody surface adjacent the deflector surface, the vortex generator being spaced from the outwardly facing edge and the inwardly facing edge.

In addition to one or more of the features described herein the vortex generator is mounted to the arcuate surface of the wheel well panel adjacent the outwardly facing edge.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 2 is a detail view of a front wheel air deflector and vortex generator, in accordance with a non-limiting example;

FIG. 3 is a perspective view of a vortex generator, in accordance with a non-limiting example;

FIG. 4 is a detail view of a front wheel air deflector and vortex generator, in accordance with another non-limiting example;

FIG. 5 is a detail view of a front wheel air deflector and vortex generator, in accordance with yet another non-limiting example;

FIG. 6 is a detail view of a front wheel air deflector and vortex generator, in accordance with still yet another non-limiting example; and FIG. 7 is a detail view of a front wheel air deflector and vortex generator, in accordance with yet still another non-limiting example.

DETAILED DESCRIPTION

Figure 1:
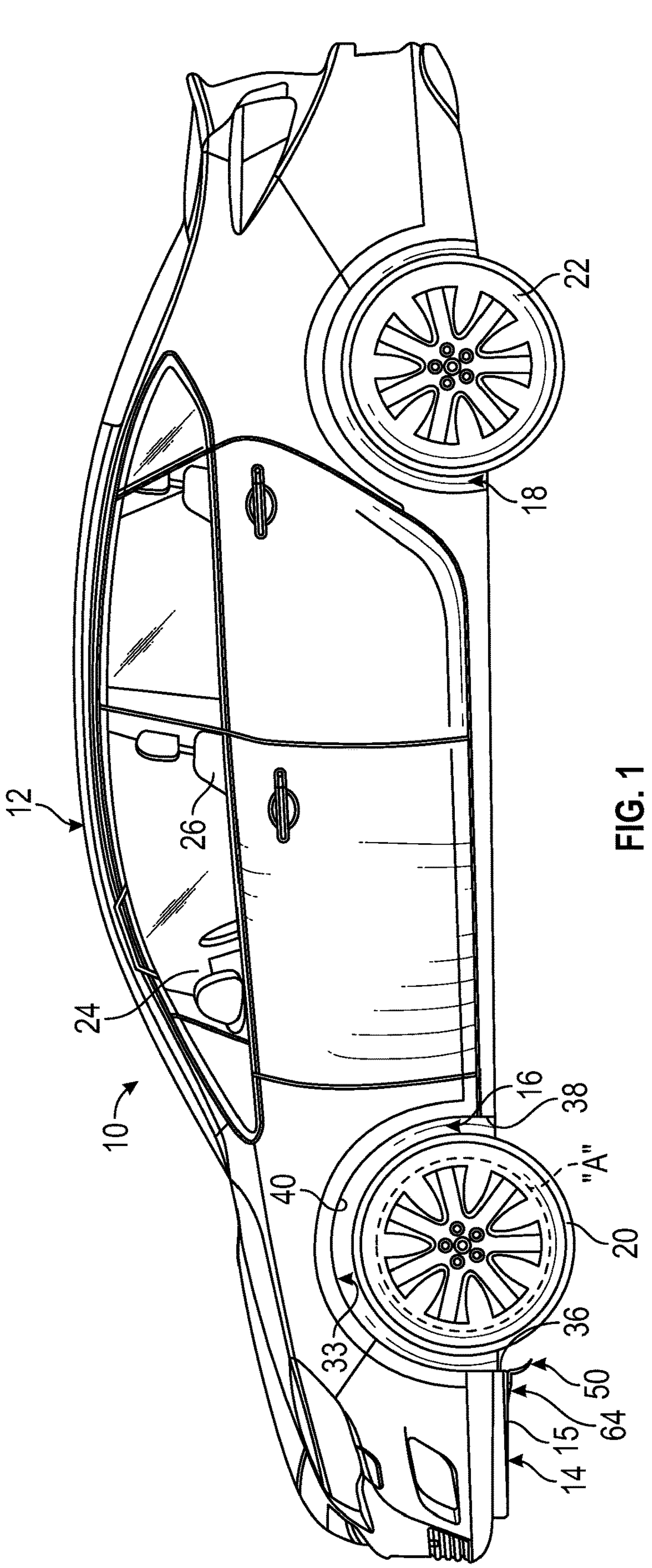
FIG. 1 is a left side view of a vehicle including a front wheel air deflector having a vortex generator, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a frame (not shown). Body 12 includes an underbody 14 having an underbody surface 15 defined by underbody panels (not separately labeled). The number and arrangement of underbody panels may vary. Body 12 includes front wheel wells 16 and rear wheel wells 18. A front wheel 20 is rotatably supported in front wheel well 16 and a rear wheel 22 is rotatably supported in rear wheel well 18. Body 12 includes a passenger compartment 24 within which are arranged a number of seats, such as indicated at 26.

In a non-limiting example, front wheel well 16 includes a wheel well panel 33 including a forward edge portion 36, a rearward edge portion 38 and an arcuate surface 40 that extends between forward edge portion 36 and rearward edge portion 38. In a non-limiting example, an air deflector 50 is arranged at forward edge portion 36. Air deflector 50 is sized, shaped, and located so as to disrupt air currents derived through forward vehicle movement (i.e., driving) that may impact forward surfaces of front wheel 20. By disrupting the air currents, drag forces on vehicle 10 are reduced and an overall operational range of vehicle 10 may be improved.

Referring to FIG. 2, air deflector 50 includes an inwardly facing edge 56, an outwardly facing edge 58, and a deflector surface 60. Deflector surface 60 is a cantilevered, curvilinear surface 62 that extends between inwardly facing edge 56 and outwardly facing edge 58. Air deflector 50 is connected to underbody surface 15. Of course, it should be understood that air deflector 50 may, in the alternative, be connected to wheel well panel 33. Deflector surface 60 is arranged to disrupt air currents flowing toward, and which may impact, forward facing surfaces of front wheel 20 in order to reduce drag.

In a non-limiting example, a vortex generator 64 is arranged adjacent to air deflector 50. Referring to FIG. 3 and with continued reference to FIG. 2, vortex generator 64 includes a triangular cross-section having a base portion 72, a first side portion 74, and a second side portion 76. First side portion 74 and second side portion 76 extend from base portion 72 and meet at a vertex 78. Vortex generator 64 is sized, formed, and mounted, to interrupt air current passing from outwardly facing edge 58 over outer surfaces of front wheel 20. That is, first side portion 74 forms a tripping surface that creates and directs an "air bubble" around front wheel 20 in order to further reduce drag perceived by vehicle 10.

In a non-limiting example, vortex generator 64 is mounted to underbody surface 15 at outwardly facing edge 58 of air deflector 50. In a non-limiting example, vortex generator 64 is mounted at an angle of about 15° relative to a hoop axis "A" of front wheel 20. That is, base portion 72, first side portion 74, and second side portion 76 taper to an apex 84 that "points" inwardly of vehicle 10. In one non-limiting example, apex 84 points inwardly relative to outwardly facing edge 58 of air deflector 50. In another non-limiting example, apex 84 points along a plane formed by outwardly facing edge 58 as shown in FIG. 4.

At this point, it should be understood that the vortex generator, in accordance with non-limiting example, can take on a wide array of shapes, number, and positions depending on how drag effects a particular vehicle and/or wheel. For example, as shown in FIG. 4, multiple vortex generators 64 may be arranged on underbody surface 15 between inwardly facing edge 56 and outwardly facing edge 58. In FIG. 5, vortex generator 64 is shown with apex 84 pointing along hoop axis "A". In FIG. 6, a vortex generator 90 is shown to include a curvilinear outwardly facing surface 92. Vortex generator 90 is arranged in front of deflector surface 60 between inwardly facing edge 56 and outwardly facing edge 58. In addition, vortex generator 90 may operate in conjunction with additional vortex generator which may have similar or different geometries in order to further improve vehicle performance by reducing pressure on a forward face of front tires of the vehicle.

In FIG. 7, a vortex generator 94 is shown to include a wedge-shaped profile 96 Wedge-shaped profile 96 includes a base portion 98, a first side portion 100, and a second side portion 102. First side portion 100 and second side portion 102 extend from base portion 98 to an apex 104. In a non-limiting example, apex 104 projects outwardly from underbody surface 15. In a non-limiting example, first side portion 100 and second side portion 102 are angled so as to deflect a portion of the air currents passing toward deflector surface 60 outwardly of an around inwardly facing edge 56 and outwardly facing edge 58 so as to disrupt air currents flowing over inwardly facing and outwardly facing surfaces (not separately labeled) of front wheel 20.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle body component comprising:

an underbody panel having an underbody surface;

a wheel well panel including a forward edge portion connected to the underbody panel, the wheel well panel defining an arcuate surface that extends from the forward edge portion connected to the underbody panel;

an air deflector connected to the forward edge portion of the wheel well panel and including an outwardly facing edge, the air deflector being arranged to extend at least a portion of the arcuate surface of the wheel well panel distally from the underbody surface of the underbody panel; and a vortex generator mounted to the arcuate surface of the wheel well panel adjacent the outwardly facing edge of the air deflector, the vortex generator disrupting air currents flowing from the outwardly facing edge.

2. The vehicle body component according to claim 1, wherein the vortex generator includes a triangular cross-section including a base portion, a first side portion, and a second side portion, the first side portion and the second side portion extending from the base portion to a vertex.

3. The vehicle body component according to claim 2, wherein a plurality of additional vortex generators are mounted to a deflector surface of the air deflector that extends inward from the outwardly facing edge, the additional vortex generators being disposed across the deflector surface from a location proximal to the vortex generator mounted adjacent the outwardly facing edge of the air deflector to a location proximal to an inwardly facing edge of the air deflector.

4. The vehicle body component according to claim 1, wherein the vortex generator includes a wedge-shaped profile having a base arranged at a deflector surface and an apex spaced from the deflector surface.

5. The vehicle body component according to claim 4, wherein the apex of the vortex generator projects outwardly of the deflector surface.

6. The vehicle body component according to claim 1, wherein the vortex generator includes a curvilinear outwardly facing surface.

7. The vehicle body component according to claim 6, wherein the vortex generator is mounted to a deflector surface of the arcuate surface.

8. A vehicle comprising:

a body defining a passenger compartment, the body including a body component comprising:

an underbody panel having an underbody surface;

a wheel well panel including a forward edge portion connected to the underbody panel, the wheel well panel defining an arcuate surface that extends from the forward edge portion connected to the underbody panel;

an air deflector connected to the forward edge portion of the wheel well panel and including an outwardly facing edge, the air deflector being arranged to extend at least a portion of the arcuate surface of the wheel well panel distally from the underbody surface of the underbody panel; and a vortex generator mounted to the arcuate surface of the wheel well panel adjacent the outwardly facing edge of the air deflector, the vortex generator disrupting air currents flowing from the outwardly facing edge.

9. The vehicle according to claim 8, wherein the vortex generator includes a triangular cross-section including a base portion, a first side portion, and a second side portion, the first side portion and the second side portion extending from the base portion to a vertex.

10. The vehicle according to claim 9, wherein the a plurality of additional vortex generators are mounted to a deflector surface of the air deflector that extends inward from the outwardly facing edge, the additional vortex generators being disposed across the deflector surface from a location proximal to the vortex generator mounted adjacent the outwardly facing edge of the air deflector to a location proximal to an inwardly facing edge of the air deflector.

11. The vehicle according to claim 8, wherein the vortex generator includes a wedge-shaped profile having a base arranged at a deflector surface and an apex spaced from the deflector surface.

12. The vehicle according to claim 11, wherein the apex of the vortex generator projects outwardly of the deflector surface.

13. The vehicle according to claim 8, wherein the vortex generator includes a curvilinear outwardly facing surface.

14. The vehicle according to claim 13, wherein the vortex generator is mounted to a deflector surface adjacent the deflector surface of the arcuate surface.

* * * * *